United States Patent
Ding et al.

(10) Patent No.: US 12,238,082 B2
(45) Date of Patent: Feb. 25, 2025

(54) CLOUD-ORCHESTRATED ROLE MANAGEMENT FOR WLAN

(71) Applicant: HEWLETT PACKARD ENTERPRISE DEVELOPMENT LP, Houston, TX (US)

(72) Inventors: Feng Ding, Beijing (CN); Hao Lu, Santa Clara, CA (US); Mohan Ram R. Bhadravati, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 474 days.

(21) Appl. No.: 17/510,953

(22) Filed: Oct. 26, 2021

(65) Prior Publication Data
US 2023/0129117 A1    Apr. 27, 2023

(51) Int. Cl.
*H04W 12/08* (2021.01)
*H04L 9/40* (2022.01)
*H04L 41/28* (2022.01)

(52) U.S. Cl.
CPC .............. *H04L 63/08* (2013.01); *H04L 41/28* (2013.01); *H04L 63/20* (2013.01); *H04W 12/08* (2013.01)

(58) Field of Classification Search
CPC ......... H04L 41/28; H04L 63/20; H04W 12/08
See application file for complete search history.

(56) References Cited

U.S. PATENT DOCUMENTS

| | | | | |
|---|---|---|---|---|
| 6,980,810 | B1 * | 12/2005 | Gerakoulis | H04W 92/02 455/442 |
| 2003/0087629 | A1 * | 5/2003 | Juitt | H04W 12/068 455/411 |
| 2010/0024009 | A1 * | 1/2010 | Comay | H04L 63/20 726/4 |
| 2011/0130149 | A1 * | 6/2011 | Yao | H04W 48/12 455/453 |
| 2016/0143028 | A1 * | 5/2016 | Mancuso | H04W 12/00 370/338 |
| 2016/0337185 | A1 * | 11/2016 | Hardison | H04W 4/80 |
| 2017/0006039 | A1 * | 1/2017 | Ernohazy | H04W 48/20 |
| 2017/0070390 | A1 * | 3/2017 | Poola | H04W 8/005 |
| 2017/0346848 | A1 * | 11/2017 | Smith | H04W 4/70 |
| 2018/0063727 | A1 * | 3/2018 | Tsunoda | H04W 48/08 |

* cited by examiner

*Primary Examiner* — David J Pearson
(74) *Attorney, Agent, or Firm* — Sheppard Mullin Richter & Hampton LLP

(57) ABSTRACT

Examples relate to configuring dynamic user roles that can be managed and distributed by a cloud-based user role service. In this way, dynamic user roles may be distributed in a more scalable manner than has been previously possible. Upon associating or connecting to an access point (AP), for example, a user device can be authenticated and assigned a user role. The AP can request the user role configuration from the cloud-based user role service. The cloud-based user role service can additionally distribute the same user role configuration/details to all neighboring APs. In this way, a user device can move, roam, or otherwise associate to another AP that post-distribution, already has the (dynamic) user role configuration, which can simply be applied to the user device.

20 Claims, 6 Drawing Sheets

*200*

```
wlan access-rule auto-attwifi-passpoint
rule any any match udp 67 68 permit
rule any any match udp 53 53 src-nat vlan 901
rule any any match udp 8209 8209 deny
rule any any match udp 8211 8211 deny
rule alias secure-login.arubanetworks.com match tcp 443 443 src-nat tunnel
rule alias login.attwifi.com match tcp 443 443 permit
rule 216.12.248.59 255.255.255.255 match tcp 443 443 permit
rule 216.12.248.59 255.255.255.255 match tcp 80 80 permit
rule alias passpoint.attwifi.com match tcp 80 80 permit
rule alias passpoint.attwifi.com match tcp 443 443 permit
rule alias instant.arubanetworks.com match any any any deny
rule 216.12.248.0 255.255.255.0 match any any any deny
rule 216.12.232.0 255.255.255.0 match any any any deny
rule 216.12.250.128 255.255.255.128 match any any any deny
rule 216.12.234.0 255.255.255.128 match any any any deny
rule 144.161.152.0 255.255.254.0 match any any any deny
rule 172.16.0.0 255.240.0.0 match any any any deny
rule 192.168.0.0 255.255.0.0 match any any any deny
rule alias netflix.com match any any any deny
rule alias hulu.com match any any any deny
rule alias pandora.com match any any any deny
rule alias spotify.com match any any any deny log
rule alias itunes.com match any any any deny
rule any any match webcategory adult-and-pornography deny
rule any any match webcategory nudity deny
rule any any match webcategory malware-sites deny
rule any any match webcategory parked-domains deny
rule any any match webcategory peer-to-peer-web deny
rule any any match webcategory phishing-and-other-frauds deny
rule any any match webcategory proxy-avoidance-and-anonymizers deny
rule any any match webcategory shareware-and-freeware deny
rule any any match webcategory spyware-and-adware deny
rule any any match webcategory bot-nets deny
rule any any match webcategory spam-urls deny
rule any any match webcategory abused-drugs deny
rule any any match webcategory alcohol-and-tobacco deny
rule any any match webcategory dating deny
rule any any match webcategory gambling deny log
rule any any match webcategory questionable deny
rule any any match webcategory sex-education deny
rule any any match webcategory swimsuits-and-intimate-apparel deny
rule any any match webcategory weapons deny
rule any any match webcategory cult-and-occult deny
rule any any match webcategory hate-and-racism deny
rule any any match webcategory illegal deny
rule any any match any any any src-nat vlan 901
bandwidth-limit downstream 5000
bandwidth-limit upstream 3000
```

FIG. 2

COMPUTING COMPONENT 450

HARDWARE PROCESSOR 452

MACHINE-READABLE STORAGE MEDIUM 454

RECEIVE, FROM AP TO WHICH USER DEVICE IS ASSOCIATED, INSTRUCTION TO ENTER BLOCKED STATE WHILE WAITING FOR CLOUD-BASED USER ROLE MANAGEMENT SERVICE TO AUTHENTICATE USER ROLE CONFIGURATION REQUEST FROM THE AP, AND ENTER BLOCKED STATE
456

UPON AUTHENTICATION OF THE USER ROLE CONFIGURATION REQUEST, RECEIVE FROM THE AP, INSTRUCTION TO ENTER UNBLOCKED STATE, AND ENTER UNBLOCKED STATE PURSUANT TO APPLICATION OF REQUESTED USER ROLE CONFIGURATION TO THE USER DEVICE
458

UPON ASSOCIATING TO A SECOND AP, EFFECTUATING COMMUNICATIONS IN ACCORDANCE WITH THE REQUESTED USER ROLE CONFIGURATION, THE REQUESTED USER ROLE CONFIGURATION BEING APPLIED TO THE USER DEVICE BY THE SECOND AP, THE SECOND AP HAVING RECEIVED THE REQUESTED USER ROLE CONFIGURATION VIA DISTRIBUTION BY THE CLOUD-BASED USER ROLE MANAGEMENT SERVICE PRIOR TO THE USER DEVICE ASSOCIATING TO THE SECOND AP
460

FIG. 4B

CLOUD-ORCHESTRATED ROLE MANAGEMENT FOR WLAN

BACKGROUND

Wireless networking can allow wireless devices, such as certain smartphones, laptops, tablets, or other suitable computing devices, to exchange data with other wired or wireless devices. In some wireless networks, a wireless device can access a wired portion of the network via one or more access points. Such access points can be designed to communicate with wireless devices at one or more radio frequencies based on capabilities of network equipment or other factors.

BRIEF DESCRIPTION OF THE DRAWINGS

The present disclosure, in accordance with one or more various examples, is described in detail with reference to the following figures. The figures are provided for purposes of illustration only and merely depict typical or example examples.

FIG. 2 illustrates an example user role configuration.

FIG. 4B is a block diagram of example computing components or devices for cloud-orchestrated user role management in accordance with some examples.

Figure 1:
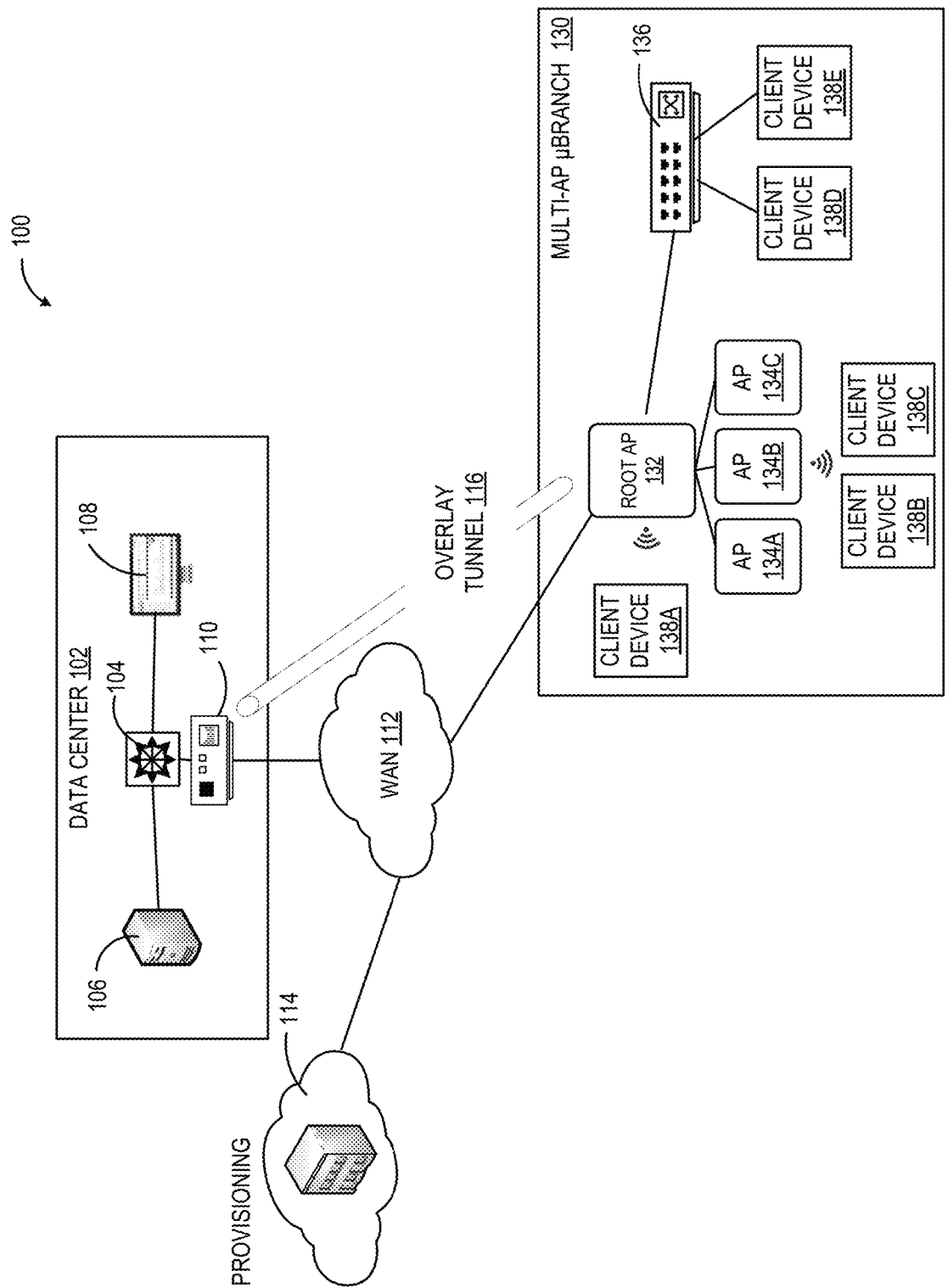
FIG. 1 illustrates an example network in which examples of the technology disclosed herein may be applied.

The figures are not exhaustive and do not limit the present disclosure to the precise form disclosed.

DETAILED DESCRIPTION

A user role can refer to a policy container or a rule/set of rules that may be maintained on a network device. A user role can be used to apply traffic policies to user traffic/communications traversing one or more network devices. With the exponential increase in user devices and network connectivity, traditional user role configuration models cannot be scaled to accommodate this increase in user devices.

Traditional user role configuration models, such as the "static" user role configuration model, may be suitable for a limited number of user roles to be specified in a network, e.g., up to 32 user role configurations. However, the static user role configuration model is incapable of managing more user role configurations. Thus, another user role configuration model, referred to as a "dynamic" user role configuration model may be used to define a set of dynamic user roles in addition to the aforementioned static user roles. Dynamic user roles can be downloaded to a network device, such as an access point (AP) to be applied for a particular client, on an as-needed basis.

Despite realizing some advantages with dynamic user roles, distributing dynamic user roles to other APs, e.g., other APs in the same AP cluster or branch, involves broadcasting such dynamic user roles, which can be an unreliable way to distribute information. Moreover, broadcasting mechanisms typically do not work when attempting to distribute information to different AP management virtual local area networks (VLANS).

Accordingly, examples of the present disclosure are directed to configuring dynamic user roles that can be managed and distributed by a cloud-based user role service so that dynamic user roles may be distributed in a more scalable manner than has been previously possible. In particular, dynamic user roles may be configured using the aforementioned user role service. For example, the user roles can be defined, as well as the policies that apply to the particular user role.

In some embodiments of the disclosed technology, upon associating or connecting to an AP, a user device can be authenticated and assigned a user role, although the AP may not necessarily know the user role configuration yet. Thus, the AP can request the user role configuration from the cloud-based user role service. During this time period, the user device may be placed into a blocked state. If the AP transmits a proper request, the requested user role configuration/details can be returned to the AP, the AP can unblock the user device, and the user role configuration can be applied to the user device. If the request is improper, e.g., the requested user role configuration is not applicable for the AP, the download request can be rejected by the cloud-based user role service. In some examples, a rejection reason code can be presented in response to the request. If the request for the user role configuration has timed out or is rejected for any reason, the user device may remain in the blocked state, and no further traffic/communications to/from the user device may be allowed.

The cloud-based user role service can additionally distribute the same user role configuration/details to all neighboring APs. In this way, a user device can move, roam, or otherwise associate to another AP that post-distribution, already has the (dynamic) user role configuration, which can be applied to the user device.

Before describing examples of the disclosed systems and methods in detail, it is useful to describe an example deployment network in which the systems and methods disclosed might be implemented in various applications. FIG. 1 illustrates one example of a network 100 that includes a multi-AP micro branch deployment. In this example, network 100 may include a data center 102 to which multi-AP micro branch deployment 130 is operatively connected. Also, part of network 100 may be a provisioning system, e.g., a cloud-based zero-touch provisioning system/service 114.

Data center 102 may be representative of an enterprise main office. Data center 102 may include a controller or core switch 104 to which a dynamic host configuration protocol (DHCP) server 106 and a policy management platform 108 are operatively connected. It should be understood that depending on how a connection between data center 102 and a remote branch (in this example, micro branch 130) is implemented, the functionality of controller or core switch 104 may differ. For example, network 100 may be a Layer 3-routed VLAN, in which case, a VPN concentrator may send traffic flows to a core switch, e.g., core switch 104, which can be high-speed core switch. Core switch 104 may then route the packets of the flows to the requisite, subsequent hop. In another example, network 100 may be a Layer 2-connected VLAN, and the VPN concentrator may route generic routing encapsulation (GRE) packets (described below) to a controller, e.g., controller or core switch 104, which in this case may function as a controller.

As would be understood by those skilled in the art, DHCP server 106 can refer to a network element that dynamically assigns an IP address and/or other network parameters to each device on the network. Policy management platform 108 may be implemented to safely/properly connect devices, such as client devices, to a network, e.g., network 100. For example, policy management platform 108 may provide new device onboarding, grant varying levels of access to the network, maintain network security, etc.

As further illustrated in FIG. 1, data center 102 may be connected to micro branch 130 via an overlay tunnel 116. Overlay tunnel 116 may connect root AP 132 of micro branch 130 to a headend gateway 110, which may act as a VPN concentrator and overlay terminator (using, e.g., a GRE tunneling protocol) for terminating VPN tunnels (here, overlay tunnel 116), thereby providing routing from micro branch 130 into data center 102. Leaf APs 134A-134C may be operatively connected to root AP 132 through which connectivity to data center 102 may be effectuated. Micro branch 130 may include one or more client devices, e.g., client devices 138A-C, each of which may associate directly to root AP 132 or to one of APs 134A-134C. In this example, micro branch 130 may further include an unmanaged switch 136 to which additional client devices, e.g., client devices 138D-E may connect. Client devices may include computing devices, such as a laptops, PCs, tablet computers, smartphones, and the like, as well as sensors or other IoT devices.

As alluded to above, user roles can refer to policy containers/sets of rules that can be used to apply traffic policies to user traffic at a network device, such as an AP. Within a user role, multiple rule entries can be defined. In some examples, each rule or rule entry specifies a particular traffic policy. An example of rule may be "allow" a specific flow, "deny" a specific flow, or "prioritize" a specific flow. A user role configuration can be complicated depending on a customer's requirements.

Referring now to FIG. 2, an example user role configuration 200 is illustrated. As can be appreciated, user role configuration 200 includes a plurality of rules that are to be applied to traffic to/from a user device to which user role configuration 200 is applied. User roles can be applied to single users or a group(s) of users. Implementation-wise, in some embodiments, a JavaScript Object Notation(JSON)/ProtoBuf/extensible markup language (XML) block may include a set of firewall rules. Once an AP receives the block, it can decode the contents of the block to discern the firewall rules. For example, the "rule any any match udp 67 68 permit" rule may allow a user/client device to obtain IP addresses from a DHCP server. For example, "rule any any match udp 53 53 src-nat vlan 901" provides for access to a domain name system (DNS) server, but specifies that DNS requests should be source network address translation (NAT) to the IP address of the AP on VLAN 901. That is, the translated source IP address of a packet is used to allow hosts with private IP addresses to access a public network]. Still other rules, such as "rule rule any any match webcategory * deny"are used to block access to websites with inappropriate content. It should be understood that FIG. 2 is merely an example user role configuration with example rules/settings/parameters, and that other rules/user rule configurations are possible, and contemplated, by the present disclosure.

As alluded to above, the traditional static user role configuration model or scheme can be used when customers have a limited number of user roles in the network. For example, an AP, such as an instant AP (IAP) can support up to 32 user role configurations. However, the diversity and number of end-user devices continue to increase, where devices such as IoT devices connect via a WLAN edge network, and hotspots/carriers may offload associated capabilities to a WLAN edge network. As noted above, when the number of user roles exceeds the maximum allowed number, traditional, static user role configuration models/schemes can no longer be used. ExampleDisclosed examples may allow users to connect their devices securely through APs.

Dynamic user roles can be used when the need for user roles exceeds the limits of traditional static user role configuration models. When dynamic user roles are used, and when an AP comes up/powers up, the AP may still obtain static user roles from a configuration management server(s). If, at a later time, a client/user device connects to the AP, that client/user device may get a user role which is not in the static configuration. The AP may then dynamically download the content of that dynamic user role and apply it for/to the client/user device. The AP may subsequently distribute the content of the dynamic user role to other APs in the same AP cluster. In this way, when a user device roams to a new AP, the new AP may be able to apply the appropriate user role without needing to contact/access the aforementioned configuration management server(s) again. In particular, dynamic user role content (user role configuration) can be transmitted to an AP controller, such as an AP virtual controller. The AP virtual controller may then redistribute the role contents to remaining AP cluster members (e.g., APs within the same AP management VLAN). The AP may also broadcast the dynamic user role configuration to other APs. Thus, a centralized virtual controller entity may be needed (which can inhibit scaling up). Again, only two methods of user role configuration distribution exist, i.e., broadcasting to other APs in the same VLAN, and use of a virtual controller, which is needed to maintain an AP "database" of APs in the cluster (which as described herein, makes scaling difficult). In addition, in some examples, dynamic user role configurations may not be distributed to APs that belong to a different AP cluster/management VLAN. Accordingly, distribution of dynamic role configurations by an AP broadcasting the dynamic user role configurations may limit distribution to network devices within the same VLAN. Alternatively, dynamic user roles can be sent to an AP virtual controller, and from the AP virtual controller, the dynamic user role configuration can be distributed to other APs, but scaling up with such a mechanism can be limited.

exampleDisclosed examples include a cloud-based user role service that addresses the scalability-related shortcomings of traditional/conventional user role configuration models. That is, examples no longer necessitate the use of a central or primary AP. Rather, all APs may be logically treated the same by the cloud-based user role service that facilitates management and distribution of dynamic user roles.

Figure 3:
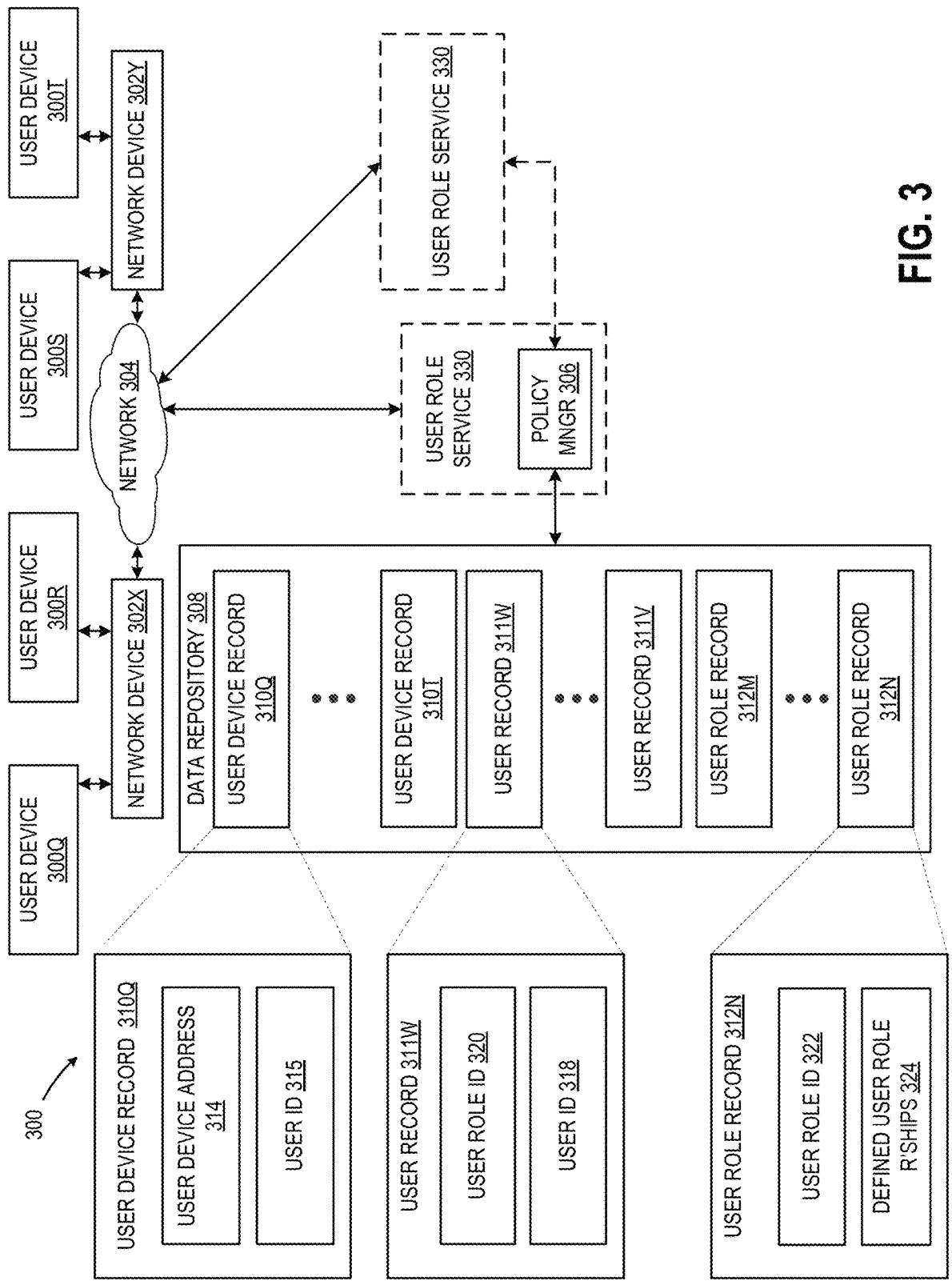
FIG. 3 illustrates an example implementation of a cloud-based role service in accordance with some examples.

FIG. 3 shows a schematic diagram of a system 300 in accordance with one or more examples. As shown in FIG. 3, the system 300 may include: user devices, e.g., user device 300Q, user device 300R, user device 300S, user device 300T; network devices, e.g., network device 302X, network device 302Y; a network 304; a policy manager 306; and a data repository 308. Each of these components is discussed below in accordance with one or more examples.

In some examples, a user device, e.g., user device 300Q, user device 300R, user device 300S, user device 300T, may be a hardware component that receives a communication from another user device of the system and/or transmits a communication to another user device of the system. The communication may be transmitted or received in one or more messages. When the user device receives a communication, the user device may be referred to as a destination of the communication. When a user device transmits a communication, the user device may be referred to as a source of the communication. The communication may be, for example, a request or response for one or more services from another user device.

In one or more examples, a user device, e.g., user device 300Q, user device 300R, user device 300S, user device 300T, may be one or more mobile user devices (e.g., laptop computer, smart phone, personal digital assistant, tablet computer, or other mobile user device), gaming console, desktop computers, servers, blades in a server chassis, or any other type of electronic user device or user devices that includes at least the minimum processing power, memory, and input and output device(s) to perform one or more examples, such as sensors, IoT devices, and the like. For example, the user device may include one or more hardware processor(s), associated memory (e.g., random access memory (RAM), cache memory, flash memory, etc.), one or more storage user device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The user device may also include one or more input device(s), such as a touchscreen, keyboard, mouse, microphone, touchpad, electronic pen, or any other type of input device. Further, the user device may include one or more output device(s), such as a screen (e.g., a liquid crystal display (LCD), a plasma display, touchscreen, cathode ray tube (CRT) monitor, projector, or other display user device), a printer, external storage, or any other output device. One or more of the output device(s) may be the same or different from the input device(s). The input and output device(s) may be locally or remotely (e.g., via the network) connected to the hardware processor(s), memory, and storage user device(s). Many different types of user devices exist, and the aforementioned input and output device(s) may take other forms.

The user device may be connected to a network 304 via a network interface connection (not shown) and a network device, e.g., network device 302X, network device 302Y. The network 304 may be a local area network (LAN), a wide area network (WAN) such as the Internet, mobile network, or any other type of network, or a combination of networks. Further, the various user devices may be in the same Internet Protocol (IP) subnet or different IP subnets. For example, two or more of the user devices may be in the same virtual local area network (VLAN).

A network device, e.g., network device 302X, network device 302Y, may be a digital hardware user device that may be communicatively coupled to the network 304. By way of example, a user device may be directly wired or wirelessly communicatively connected to a single AP, which may be directly communicatively connected to a single controller, which, in turn, may be connected to the network (e.g., network 304). In the example, the network device may be the AP, the controller, an AP that includes the functionality of a controller, a switch (e.g., mobility access switch), or other such user device. Additionally, by way of an example, one network device may be a controller while another network device may be an AP. The network device that is the AP in the example may or may not be connected to the network via the network device that is a controller.

An AP may be a separate hardware unit from a user device that is directly, e.g., wired or wirelessly, connected to the user device and is in a communication path from the user device to the network. In other words, the AP may be directly connected via the direct wired/wireless connection to a network interface card on the user device (e.g., user device 300Q, user device 300R, user device 300S, user device 300T). Further, APs may be directly connected to the network 304 or may be connected to the network 304 via a controller. By way of example, the AP may include a wireless access point (WAP) that communicates wirelessly with user devices using Wi-Fi, Bluetooth or related standards and that communicates with a wired network.

Each network device may be connected to any number of user devices at any moment in time. Specifically, each network device may be connected to no user devices, a single user device, or multiple user devices at any particular moment in time. Further, the number of user devices connected to a network device may be heterogeneous amongst network devices, i.e., network devices may be connected to different numbers of user devices.

In one or more examples, a network device may be configured to decide whether a user device may communicate with another user device in the system. The network device making the decision may be the network device associated with the source of the message and/or the network device associated with the target of the message.

Continuing with FIG. 3, the network devices, e.g., network device 302X, network device 302Y, may be operatively connected, continuously or intermittently, directly or via the network, to a policy manager 306. The policy manager 306 may correspond to a computing system or execute on a computing system and may cause the computing system to manage user device records, e.g., user device record 310Q (corresponding to user device 300Q), user device record 310T (corresponding to user device 300T), and user role records, e.g., user role record 312M, user role record 312N. In particular, the policy manager 306 may include a user interface to allow an administrator to create, configure, modify, and delete user device records and user role records. The policy manager 306 may further include functionality to update the user device records and user role records accordingly.

The policy manager 306 computing system may be one or more mobile user devices (e.g., laptop computer, smart phone, personal digital assistant, tablet computer, or other mobile user device), desktop computers, servers, blades in a server chassis, or any other type of computing user device or user devices that includes at least the minimum processing power, memory, and input and output device(s) to perform one or more examples. Many different types of computing systems exist, and the aforementioned input and output device(s) may take other forms. Further, one or more elements of the aforementioned computing system may be located at a remote location and may be connected to the other elements over a network.

As noted above, examples of the disclosed technologies may include a cloud-based user role service through which user role configurations can be maintained and accessed. Accordingly, policy manager 306 may be embodied in/as part of a cloud-based user role service 330 that may be operatively connected to network 304. In some examples, policy manager 306 may be implemented as a stand-alone/separate component that is accessible by a remotely-implemented cloud-based user role service 330. As illustrated in FIG. 3, policy manager 306 may be a part of user role service 330, or may be implemented separately from user role service 330. In either case, the cloud-based user role service may allow for improved scalability (with larger numbers of user devices), and the ability to access and provide dynamic user role configurations to network devices. This is in contrast to, e.g., broadcasting, where in a large-scale VLAN, for example, broadcast messages would have to be sent for each and every user role updating/downloading to all VLAN members. When using a virtual controller, the cost of maintaining AP membership can increase by the number of APs, and currently for an instant AP cluster, for example, only 128 APs per cluster can be supported, putting a limit on scalability. That is, cloud-based user role accessbility is not limited by maximum numbers of supported APs, and/or per-user role updating/downloading constraints.

In some examples, dynamic user roles can be configured using policy manager 306 vis-à-vis cloud-based user role service 330. For example, a network administrator or similar entity may define the dynamic user roles, the policies according to which the dynamic user roles are to be applied, and the actual dynamic user role configurations (discussed in greater detail below). Once a user device, e.g., user device 300Q, associates to an AP, e.g., an example of network device 302X, user device 300Q may be authenticated. For example, authentication of a user device may be based on credentials, such as username and password, a device certificate, or device MAC address, etc. Network device 302X, which may be an AP can forward the credentials securely to a backend authentication server, such as a remote authentication dial-in user service (RADIUS) server, which then performs authentication of the user device. Other means or methods of authentication may be used, e.g., multifactor authentication.

If user device 300Q is authenticated/passes authentication, network device 302X may assign a user role to user device 300Q. It should be understood that assigning a user role to user device 300Q does not yet include parsing and applying the actual user role configuration to user device 300Q communications. Rather, network device 302X may request the actual user role configuration, embodied as a user role record, from user role service 330 vis-à-vis policy manager 306.

User role service 330 can determine if the user role configuration request is proper. Determining whether a user role configuration request is proper can involve determining the source of the request, and determining whether or not that source is allowed to receive the requested user role configuration. For example, user role service 300 may determine if the request for the user role configuration is coming from an allowed network device, or an allowed WLAN service set identifier (SSID). That is, a particular dynamic user role may be selectively enabled for only certain APs or SSIDs. If proper, network device 302 may transmit the requested user role configuration in the form of a user role record (e.g., as a file, data repository record from data repository 308, as will be discussed below). If the request is improper, user role service 330 can reject the request, and in some examples, a rejection reason code or similar notification can be transmitted to the requesting network device, user device, user, etc. For example, if an AP has requested a role that is not yet known/configured in the cloud-based user role service, a rejection reason code such as "unknown role" can be transmitted.

User role service 330 may also transmit or distribute the user role configuration/record to neighboring APs, or, in some examples, to all neighboring APs of the request AP. In this example, network device 302Y may be a neighboring AP to network device 302X. It should be understood that while network device 302X is waiting to receive the user role configuration from user role service 330, it may place user device 300Q into a temporary blocked state. Once network device 302X receives the requested user role configuration, network device 302X can unblock user device 300Q, and network device 302X can apply the user role configuration to user device 300Q. It should be understood that once the user role configuration is applied, all traffic to/from user device 302X will be governed/controlled/restricted (as may be the case) in accordance with the user role configuration, e.g., in accordance with the defined user role relationships set forth in the user role configuration/record. In some examples in which the request is denied, in addition to rejecting the request (and in some examples, transmitting a rejection reason code or other similar notification to user device 300Q), user device 300Q may remain in its blocked state. This may prevent any further traffic from being sent/received by/from user device 300Q. It should be understood that in some examples, the rejection reason code/notification can be sent by/from the user role service 330.

Recalling that network device 302X distributes a requested user role configuration to neighboring network devices, such as network device 302Y, if user device 300Q were to associate to/roam to network device 302Y, network device 302Y may apply the user role configuration to user device 300Q. For example, network device 302Y need not contact or access user role service 330 or any other network device. It should be understood that an AP, e.g., one example of network device 302Y, may maintain a list of user device records containing corresponding user IDs (e.g., MAC addresses) and user role IDs as described herein. The dynamic user role configuration may also be maintained as set of user role records (e.g., user role record 312N), each of which contains a user role ID (e.g., user role ID 322) and rules associated with that user role (e.g., defined user role relationships 324). The AP may first determine if the roamed user device's entry is present in a user device record cache table, and if so, effectuates the assignment of the user role ID to the user. It should be understood that the user device record cache table can contain a list of user device entries regarding user devices currently connected to an AP. In each user device entry, at least some layer 2/layer 3 attributes, such as device Media Access Control address, Internet Protocol address, Virtual Local Area Network ID, Access Control List/Role, etc. The AP may then look up the user role record cache table for this role ID, and obtain the user role configuration.

The policy manager 306 may be connected to a data repository 308. In one or more examples, the data repository 308 is any type of storage unit and/or user device (e.g., a file system, database, collection of tables, or any other storage mechanism) for storing data. Further, the data repository 308 may include multiple different storage units and/or user devices. The multiple different storage units and/or user devices may or may not be of the same type or located at the same physical site. Further, the data repository may be or may execute on the same computing system as policy manager 306. Alternatively or additionally, the data repository 308 may be on a separate computing system.

The data repository 308 may be configured to store user device records, e.g., user device record 310Q, user device record 310T, for each user device connected to a network device, e.g., network device 302X, network device 302Y. A user device record, e.g., user device record 310Q, user device record 310T, may include information about a user device. Any mechanism may be used to store a user device record without departing from the scope of the claims. In particular, a user device record may be a file, a database record, an entry or row in a table, or another data structure.

FIG. 3 shows an example of a user device record, user device record 310Q. As shown in FIG. 3, the user device record 310Q may include, for example, a user device address 314 and a user identifier 315 in accordance with one or more examples. A user device address 314 may be a unique identifier for a user device. For example, the user device address may be a media access control (MAC) address, a serial number of the user device, or another unique identifier of the user device.

A user identifier 315 may be a unique identifier of a user that owns or otherwise controls the user device. The user identifier may be a single piece of identification (e.g., tax identifier, login name, email address, a system assigned unique identifier) or combination of identifiers (e.g., combination of mailing address and name, combination of name and birthdate, or other combination).

In one or more examples, the data repository further includes functionality to store user records, e.g., user record 311W, user record 311V. Each user record may maintain a user profile. In one or more examples, the user profile corresponds to information about a user of one or more user devices. FIG. 3 shows an example user record, e.g., user record 311W. As shown in the example, the user record 311W may include a user identifier 318 and a user role identifier 320. The user identifier 318 may be a cross reference to user identifier 315 in the device record. Thus, the user identifier may be the same or similar to the user identifier discussed above.

In one or more examples, a user role identifier, such as user role identifier 320, may be an identifier of the user role of the user. A user role may be a logical classification of a user that defines the part the user plays within a group or within a particular activity. For example, the user role may be the employment position of the user, the department in which the user works, a project on which the user is working, an organization to which the user belongs, or other classification of the user. The term "user role" as used in this application excludes media access control addresses and internet protocol addresses of the user devices.

Although FIG. 3 shows a user record as including only one user role identifier, the user record may include multiple user role identifiers for when a user has multiple user roles. The data repository 308 may further store information defining a hierarchy of user roles. The hierarchy may define a precedence arrangement of user roles regarding whether a communication is allowed. Thus, user roles may be accessed according to the hierarchy to determine whether a particular communication is allowed. If the user role is silent regarding a communication, then the next user role is accessed in accordance with one or more examples.

The data repository 308 may further include functionality to store user role records (e.g., user role record 312M, user role record 312N) for each defined user role in the system. As shown in FIG. 3, user role N record 312N includes a user role identifier 322 and a set of defined user role relationships 324. The user role identifier 322 may be a cross reference to user role identifier 320 that is part of a user device record.

The set of defined user role relationships 324 associated with a particular user role may define whether communication is allowed between user devices of users having the particular user role. The defined user role relationships can, in some examples, be defined prior to when the message that is to be allowed or denied is sent. In some examples, the defined user role relationships for a particular user role may be maintained as a set of user roles to which the particular user role is allowed to communicate, as a set of user roles to which the particular user role is denied communication, or a combination thereof. Further, although not shown, a set of one or more default user role relationships may be defined that specify a default action when a user role relationship is not defined in the set of user role relationships.

In one or more examples, the set of user role relationships may include separate user role relationships for different stages of communication. A stage of communication may refer to the temporal position of a communication within the overall communication session. For example, a user role relationship may exist for when a first particular user role is initiating communication with a second particular user role. Another user role relationship may exist for when the first particular user role is responding to a communication from the second particular user role. A third user role relationship may exist for when the first particular user role has already established communication with the second particular user role. It should be understood that a communication session can refer to a record whose key may be five attributes: source IP, destination IP, protocol (TCP/UDP), source port, and destination port, and whose value is the "action" performed by an AP, such as Permit/Deny/Translate Source IP/Translate Destination IP, etc.

In one or more examples, the set of user role relationships may include separate user role relationships for different types of communication. A type of communication may refer to the type of data being transmitted in the communication. For example, separate user role relationships may exist for voice data, video data, background data, and best effort data.

In one or more examples, individual user role relationships may be defined for a collection of user roles. For example, one user role relationship may be defined for when the user(s) corresponding to the source and/or destination of a communication has a first collection of user roles while another user role relationship may be defined for when the user(s) corresponding to the source and/or destination has a second collection of user roles. In the example, the first and second collection may or may not overlap in user roles.

Different techniques for storing user role relationships may be used. For example, user role relationships may be stored as access control lists, in a set of one or more tables, or using any other storage mechanism for storing permissions. Further, FIG. 3 show only one possible storage structure for storing records in the data repository. Other storage structures may be used without departing from the scope of the claims.

While FIG. 3 shows a configuration of components, other configurations may be used without departing from the scope of the claims. For example, various components may be combined to create a single component. As another example, the functionality performed by a single component may be performed by two or more components.

Figure 4A:
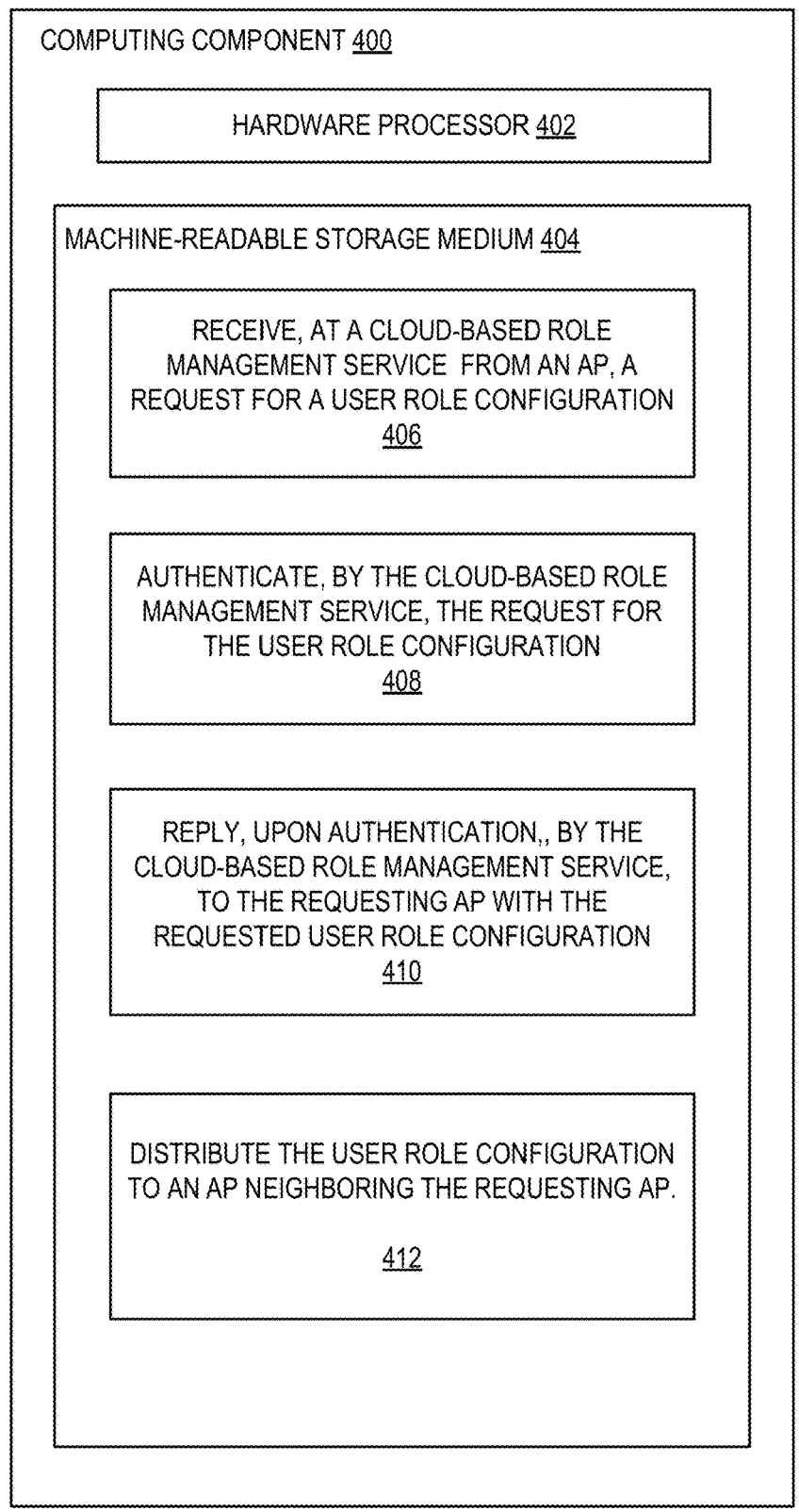
FIG. 4A is a block diagram of example computing components or devices for cloud-orchestrated user role management in accordance with some examples.

FIG. 4A is a block diagram of an example computing component or device 400 for performing cloud-orchestrated user role management in accordance with one example. Computing component 400 may be, for example, a controller, processor, or any other similar computing component capable of processing data, e.g., an AP or AP controller. In the example implementation of FIG. 4A, computing component 400 includes a hardware processor 402, and machine-readable storage medium 404.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-

412, to control processes or operations for distributing user role configurations. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-412.

Hardware processor 402 may execute instruction 406 to receive, at a cloud-based role management service (also referred to as the aforementioned user role service) from an AP, a request for a user role configuration. As described above, a user device may connect/associate to a network device, such as an AP, e.g., one of network devices 302X, 302Y (FIG. 3). It should be understood that such a cloud-based role management service can be implemented in network devices other than just APs. For example, a cloud-based role management service can be implemented at any network device capable of enforcing user data policies based on a user role, e.g., a wired switch, a controller, etc. Upon connecting/associating to an AP, the AP can authenticate the user device. As noted above, the user device can be authenticated based on user device identifying information/credentials (and/or credentials regarding the SSID to which the user device belongs) that can be sent to an authentication server/service. If the user device passes the authentication process, the AP may assign a user role to the authenticated user device. As described above (in conjunction with FIG. 3), the user device may be identified by a user device address, e.g., MAC address, and may further be associated with some form of user identification/identifier indicating a user associated with/that utilizes the user device. For example, user device record 310Q (FIG. 3) includes both user device address 314 and user ID 315. In some examples, the user ID 315 corresponds to a user ID 318 included as part of a user record, e.g., user record 311W, which may further include a user role ID 320. That user role ID 320 in turn, corresponds to a user role ID 322 included in a user role record 312N, which in turn further includes defined user role relationships 324. In this way, based on the user/user device, the appropriate user role can be determined.

In some examples, the AP will perform a check to determine if it has the corresponding user role configuration that it can apply to the user device. If not, the AP may request the user role configuration file/record from the cloud-based user role management service.

Hardware processor 402 may execute instruction 408 to authenticate, by the cloud-based role management service, the request for the user role configuration (that was received from the AP to which the user device connected). In some examples, authenticating/verifying that the user role configuration request is proper can involve determining the source of a request, and determining whether or not that source is allowed to receive the requested user role configuration. Again, user roles can be selectively applied depending on the needs/desires of a network's controlling entity/entities, in accordance with a network's topology, configuration, etc.

Hardware processor 402 may execute instruction 410 to reply, upon authentication, by the cloud-based role management system, to the requesting AP with the requested user role configuration. That is, the cloud-based role management system can, through the policy manager 306 (FIG. 3), retrieve the appropriate user role configuration/record, which the cloud-based role management system can then forward to the requesting AP so that the requesting AP may download the user role configuration/record. The requesting AP may then apply the downloaded user role configuration/record to the connected user device.

As noted above, until the user role configuration/record is received and applied, the connected user device is placed into, and will remain in a blocked state such that it cannot transmit or receive any communications/data. Once the request for the user role configuration/record is authenticated, received, and applied, the AP can move the user device from its blocked state to an unblocked state. As also noted above, in the event the request for the user role configuration/record is invalid, or otherwise unallowed, the user device will remain in the blocked state so no further traffic transmission/receipt is allowed.

Hardware processor 402 may execute instruction 412 to distribute the user role configuration to an AP neighboring the requesting AP. In the context of distributing user roles, an AP neighbor relationship can be defined on the basis of successful radio frequency communication between two APs. If an AP can "hear" RF transmissions from another AP, the two APs may be considered neighbors of each other. More precisely, if an AP can successfully decode any 802.11 standard-compliant frame from another AP which is received in any one of its radio interfaces, they are neighbors of each other. As discussed above, the cloud-based role management service, upon receiving the requested user role configuration, may forward or distribute the user role configuration to other neighboring APs of the requesting AP. To accomplish this, the cloud-based role management service may rely on a service/mechanism that can analyze network RF data to derive/optimize the network's configuration. In some examples, the network analysis mechanism can be cloud-based. Every AP, for example, in a network can periodically perform scanning by sending 802.11 probe request frames on RF channels on which APs are allowed to operate. Neighboring APs respond to these requests with 802.11 probe response frames. The AP performing the scan operation collects these probe responses together in a RF neighbor report, and can send them to the cloud-based network analysis service. The cloud-based network analysis service may then analyze the RF neighbor report from every AP, and build an RF neighborhood graph of APs. From this graph, the cloud-based network analysis service can identify RF neighbors for any given AP. The cloud-based role management service can leverage this information regarding identified neighbors of the requesting AP, and may forward/distribute the requested user role configuration to one or more of the neighboring APs. In some examples, this distribution may also be a selective process, where some APs, but not all neighboring APs receive the user role configuration. For example, a set of APs may be defined or grouped together and specified to receive distributed user role configurations. Alternatively still, some other commonality may be the basis for distribution/broadcasting of a user role configuration, e.g., all APs having the same site label. It should be understood that a site can refer to a physical location where a set of devices are installed, e.g., campus, branch, or venue. In some embodiments, sites can be used as a primary navigation element. For example, if some devices are deployed in a campus, a site labeled CampusA can be created. Devices within CampusA can also be tagged using labels. For example, if the campus in which CampusA is defined consists of multiple buildings, the devices deployed in the campus can be labeled as Building1 or Lobby. If the devices in a specific location or an area within a specific location must have similar configuration, the devices can be grouped together.

It should be noted that neighboring APs need not be limited to APs that belong to the same AP cluster or are managed by the same management VLAN (in contrast to conventional/traditional user role configuration models/mechanisms described above). Furthermore, examples avoid the traditional limitations of user role configuration distributionexample and are able to implement a more efficient method or model. This is because distribution of a requested user role configuration/record occurs with respect to neighboring APs rather than to all the APs of a particular AP cluster, for example. Less time may be taken to distribute a user role configuration/record, and fewer resources may be used/are occupied to distribute the user role configuration/record. Further still, and as noted above, an AP need not have to interact with any other network device/entity (such as the cloud-based role management service) to obtain a user role configuration to be applied to a connected user device. Upon distribution by the requesting AP, neighboring AP(s) may already have the user role configuration/record in the event, the user device subsequently roams to/other connects/associates to one or more such neighboring APs.

FIG. 4B is a block diagram of an example computing component or device 450 for performing cloud-orchestrated user role management in accordance with another example. Computing component 450 may be, for example, a controller, processor, or any other similar computing component capable of processing data, e.g., a user device processor. In the example implementation of FIG. 4B, computing component 450 includes a hardware processor 452, and machine-readable storage medium 454.

Hardware processor 452 may be one or more central processing units (CPUs), semiconductor-based microprocessors, and/or other hardware devices suitable for retrieval and execution of instructions stored in machine-readable storage medium, 454. Hardware processor 452 may fetch, decode, and execute instructions, such as instructions 456-460, to control processes or operations for establishing connections, synchronizing, and publishing routes/states. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 454, may be any electronic, magnetic, optical, or other physical storage device that contains or stores executable instructions. Thus, machine-readable storage medium 454 may be, for example, Random Access Memory (RAM), non-volatile RAM (NVRAM), an Electrically Erasable Programmable Read-Only Memory (EE-PROM), a storage device, an optical disc, and the like. In some examples, machine-readable storage medium 454 may be a non-transitory storage medium, where the term "non-transitory" does not encompass transitory propagating signals. As described in detail below, machine-readable storage medium 454 may be encoded with executable instructions, for example, instructions 456-460.

Hardware processor 452, which may be a user device hardware processor may execute instruction 456 to receive, from an AP to which the user device is associated, an instruction to enter a blocked state while waiting for a cloud-based user role management service to authenticate a user role configuration request from the AP, and enter a blocked state. As described above, a user device may be prohibited from sending/receiving messages/communications while in a blocked state. This provides time to allow the user role configuration request to be authenticated.

Hardware processor 452 may execute instruction 458 to, upon authentication of the user role configuration request, receive from the AP, an instruction to enter into an unblocked state. Accordingly, the user device may enter the unblocked state pursuant to application of the requested user role configuration to the user device. That is, once the AP is able to control traffic to/from the user device based on the requested user role configuration, the AP instructs the user device to transition from its blocked state to an unblocked state. In the unblocked state, the user device can receive/send traffic.

As noted above, embodiments improve conventional user role configuration management and distribution by allowing user role configurations to be distributed to desired network devices such as APs. This distribution, by virtue of being performed by a cloud-based role management service, is not constrained by limitations associated with conventional systems and mechanisms, such as via a virtual controller or via broadcasting. Rather, a first AP may distribute a a user role configuration to another AP so that when a user device later-associates to to that other AP, the user role may be applied. As also discussed above, distribution is not limited to APs residing in the same cluster or branch. For example, neighboring APs may receive the requested user role configuration. As noted above, neighboring APs in some contexts, can be based on an AP hearing RF traffic of another AP. In some scenarios, neighboring APs tend to be APs to which a user device may connect/associate to from another AP, regardless of whether the APs belong to the same cluster/branch. Thus, the constraints of typical user role management models need not apply to the disclosed embodiments.

Figure 5:
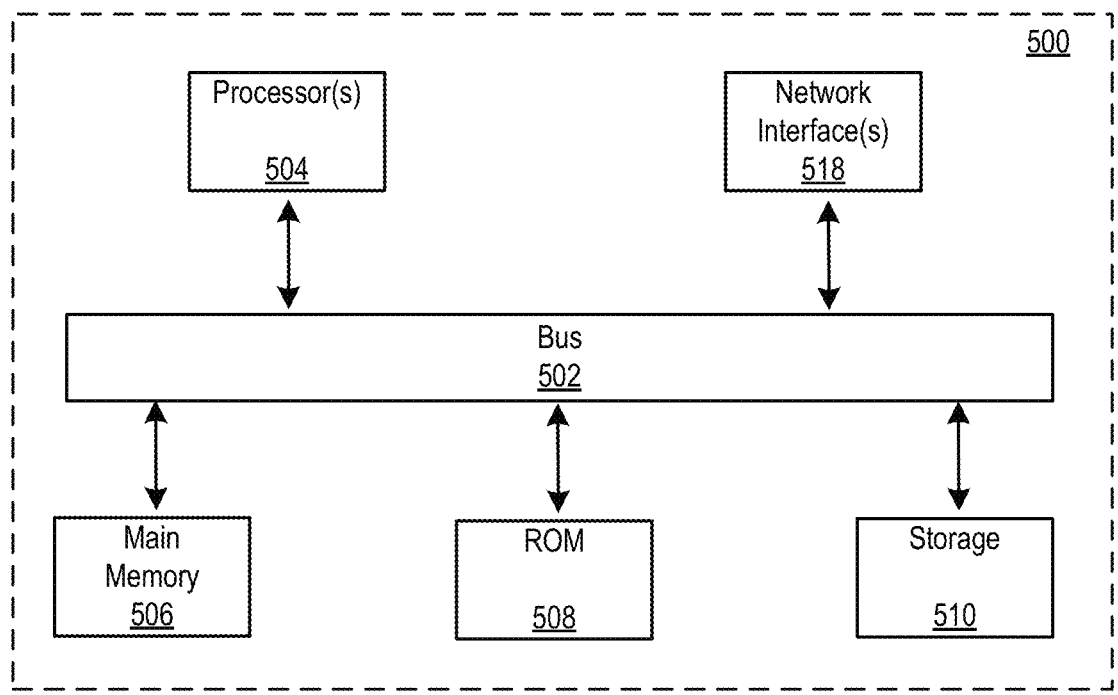
FIG. 5 is an example computing component that may be used to implement various features of examples described in the present disclosure.

FIG. 5 depicts a block diagram of an example computer system 500 in which various of the examples described herein may be implemented. The computer system 500 may include a bus 502 or other communication mechanism for communicating information, one or more hardware processors 504 coupled with bus 502 for processing information. Hardware processor(s) 504 may be, for example, one or more general purpose microprocessors. The aforementioned components/entities, such as user role service 330, policy manager 306, network device 302X, etc. may be implementations or examples of computer system 500.

The computer system 500 may include memory units, such as a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 may further include a read-only memory (ROM) 508 or other static storage device coupled to bus 502 for storing static information and instructions for processor 504. A storage device 510, such as a magnetic disk, optical disk, or USB thumb drive (Flash drive), etc., may be provided and coupled to bus 502 for storing information and instructions.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one example, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Computer system 500 also includes a communication/network interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a processor; and
   a memory operatively connected to the processor, the memory including instructions that when executed, cause the processor to:
   receive, from a network device, a request for a user role configuration for a user device associated with the network device, wherein the request is received after the network device authenticates the user device, and after the user device is placed in a blocked state;
   authenticate the request for the user role configuration;
   reply, upon authentication, to the requesting network device with the requested user role configuration; and
   distribute the user role configuration to another network device neighboring the requesting network device, the other device being identified as a neighbor by virtue of an ability of the network device to decode transmissions intended for the other network device,
   wherein the user device is placed in an unblocked state based on the reply with the requested user role configuration.

2. The system of claim 1, wherein the instructions effectuate a cloud-based role management service.

3. The system of claim 1, wherein the network device comprises a device capable of enforcing the user role configuration.

4. The system of claim 1, wherein the network device comprises an access point.

5. The system of claim 1, wherein the instructions that when executed further cause the processor to determine that a source of the request is allowed to receive the requested user role configuration, the source of the request comprising the network device.

6. The system of claim 1, wherein the memory includes further instructions that when executed, authenticate a user device upon the user device associating to the network device.

7. The system of claim 6, wherein authentication of the user device is based at least one of credentials identifying the user device or a group of network devices to which the user device belongs.

8. The system of claim 6, wherein the memory includes further instructions that when executed, cause the processor to apply the requested user role configuration to the user device.

9. The system of claim 1, wherein the memory includes further instructions that when executed, cause the processor to place the user device in the unblocked state upon applying the requested user role configuration to the user device.

10. The system of claim 1, wherein the memory includes further instructions that when executed, cause the processor to select the another neighboring network device based on a radio frequency analysis of network devices to determine the ability to decode transmissions intended for the another network device.

11. The system of claim 1, wherein all communications to and from the user device are prohibited while in the blocked state.

12. A method, comprising:
    receiving, from an access point, a request for a user role configuration for a user device specifying policies applicable to user traffic traversing the access point, wherein the request is received after the access point authenticates the user device, and after the user device is placed in a blocked state;
    authenticating the request for the user role configuration;
    replying, upon authentication, to the requesting access point with the requested user role configuration; and
    distributing the user role configuration to another access point neighboring the requesting access point, the other access point being identified as a neighbor by virtue of an ability of the access point to decode transmissions intended for the other access point,
    wherein the user device is placed in an unblocked state based on the reply with the requested user role configuration.

13. The method of claim 12, wherein the another neighboring access point is part of the same virtual local access network to which the requesting access point belongs.

14. The method of claim 12, wherein the another neighboring access point is part of a different virtual local access network from that to which the requesting access point belongs.

15. The method of claim 12, further comprising placing a user device associated to the requesting access point in the blocked state while authenticating the request for the user role configuration.

16. The method of claim 15, further comprising placing the user device in the unblocked state upon applying the requested user role configuration to the user device subsequent to authentication of the request for the user role configuration.

17. A user device, comprising:
    a processor; and
    a memory operatively connected to the processor, the memory including instructions that when executed, cause the processor to:
    after associating with a first network device, enter a blocked state based on instructions received from the first network device to enter the blocked state, wherein the user device is in the blocked state while waiting for a cloud-based user role management service to authenticate a user role configuration request from the first network device to which the user device is associated;
    upon authentication of the user role configuration request, receive instructions from the first network device to transition to an unblocked state and enter the unblocked state pursuant to application of the requested user role configuration to the user device by the first network device; and
    upon associating to a second network device, effectuating communications in accordance with the requested user role configuration, the requested user role configuration being applied to the user device by the second network device, the second network device having received the requested user role configuration via distribution by the cloud-based user role management service prior to the user device associating to the second network device, wherein the second network device is determined to be a neighbor of the first network device by virtue of an ability of the first network device to decode transmissions intended for the second network device.

18. The user device of claim 17, wherein all communications to and from the user device are prohibited while in the blocked state.

19. The user device of claim 17, wherein authentication of the user role configuration request is based on identifying information linking a user device record to a user record and a user role record.

20. The user device of claim 17, wherein the user device is assigned a user role corresponding to the requested user role configuration prior to application of the user role configuration to the user device by the first network device.

\* \* \* \* \*